Feb. 20, 1923.
H. M. GLEASON.
SAFETY PIN CARD AND METHOD OF CHARGING THE SAME.
FILED AUG. 19, 1921.
1,445,831.
2 SHEETS—SHEET 1.
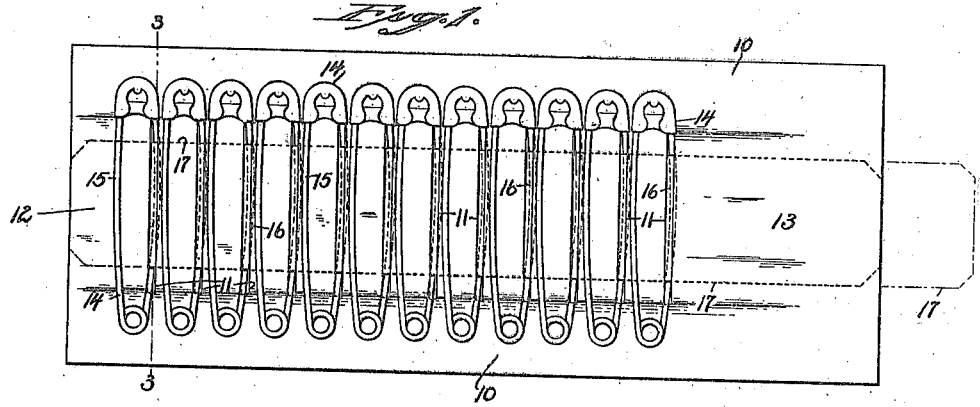
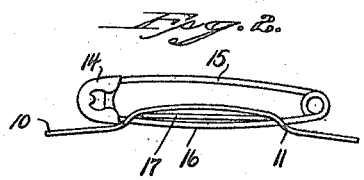 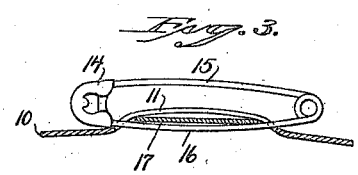
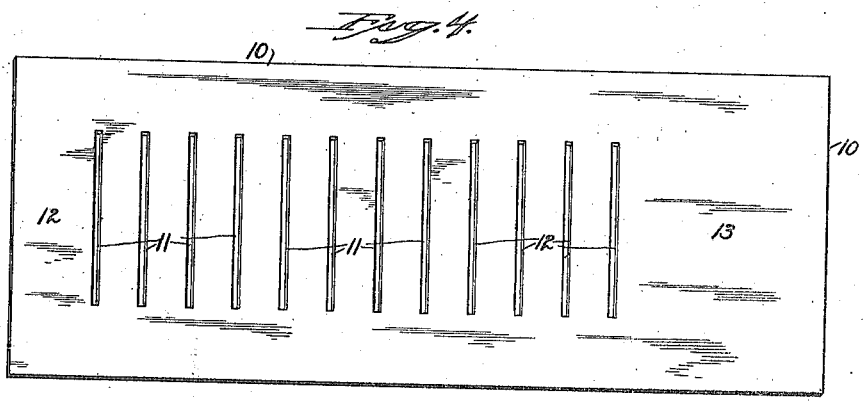
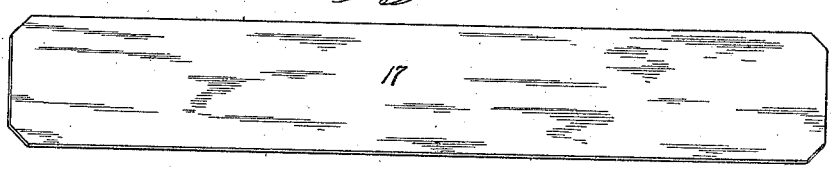
Inventor
Henry M Gleason
by Seymour Earle
Attys Feb. 20, 1923.
H. M. GLEASON.
SAFETY PIN CARD AND METHOD OF CHARGING THE SAME.
FILED AUG. 19, 1921.
1,445,831.
2 SHEETS—SHEET 2.
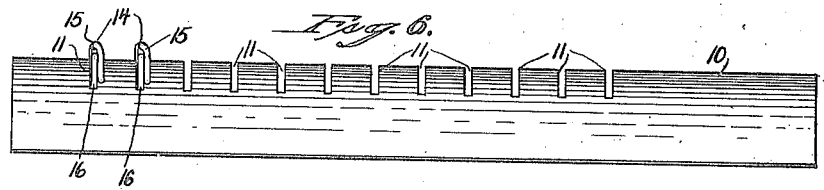
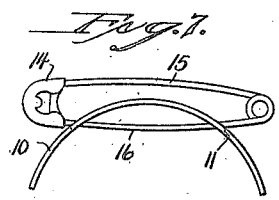
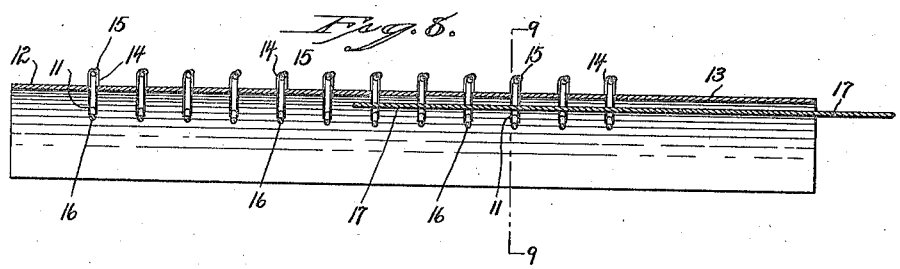
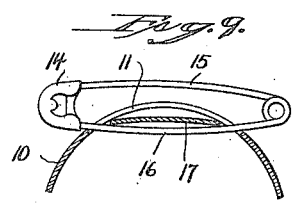
Inventor.
Henry M Gleason
by Seymour & Earle
Attys Patented Feb. 20, 1923.

1,445,831

UNITED STATES PATENT OFFICE.

HENRY M. GLEASON, OF WATERBURY, CONNECTICUT, ASSIGNOR TO CHASE COMPANIES, INCORPORATED, OF WATERBURY, CONNECTICUT, A CORPORATION.

SAFETY-PIN CARD AND METHOD OF CHARGING THE SAME.

Application filed August 19, 1921. Serial No. 493,750.

*To all whom it may concern:*

Be it known that I, HENRY M. GLEASON, a citizen of the United States, residing at Waterbury, in the county of New Haven and State of Connecticut, have invented a new and useful Improvement in Safety-Pin Cards and Methods of Charging the Same; and I do hereby declare the following, when taken in connection with the accompanying drawings and the characters of reference marked thereon, to be a full, clear, and exact description of the same, and which said drawings constitute part of this application, and represent, in—

Fig. 1 a plan view of a card of safety-pins produced in accordance with my invention.

Fig. 2 an end view thereof.

Fig. 3 a view thereof in transverse section on the line 3—3 of Fig. 1.

Fig. 4 a detached perspective view of the mounting-card.

Fig. 5 a corresponding view of the locking-strip.

Fig. 6 a view of the mounting-card in side elevation after it has been longitudinally-bowed for the reception of the safety-pins, two of which are shown.

Fig. 7 a view thereof in end elevation.

Fig. 8 a central, longitudinal, sectional view with the locking-strip partially inserted and with the card provided with its full complement of pins.

Fig. 9 a view thereof in transverse section on the line 9—9 of Fig. 8.

My invention relates to an improved safety-pin card and method of charging the same, the object being to greatly reduce the cost of marketing safety-pins and producing a card of superior convenience. Heretofore, it has been the almost invariable practice, in marketing safety-pins, to mount them upon cards, a dozen to each card. This has generally been done manually and has been attended by a very considerable expense for labor on account of the number of operations involved, such as opening the pins, bowing the card, sticking the pins, one by one, through the card with precision as to spacing, closing the pins, and then allowing the card to recover its flat form. Machines largely automatic have been produced for effecting these several operations automatically, but such machines, on account of their complexity and the peculiar character of the operations, have not proved commercially practicable.

With the end in view of avoiding the above objections and greatly reducing the cost of carding safety-pins, as well as producing a card of superior convenience for the user, my invention consists in a safety-pin card comprising a mounting-card pierced for being charged with a plurality of safety-pins in spaced relation to each other, and a locking-strip inserted through all of the pins and held in place against one face of the mounting-card. My invention further consists in a method of carding safety-pins, consisting in piercing a mounting-card, then inserting safety-pins into the piercings of the card, and then inserting a pin-retaining member through all of the pins, whereby they are held in the piercings of the card. My invention consists in further details in the construction of the card and further steps in the method as will be hereinafter described and pointed out in the claims.

In carrying out my invention as herein shown, I employ an oblong rectangular mounting-card 10 corresponding generally in form and size to the cards heretofore used. This card is pierced to form a series of twelve transversely-arranged, long, narrow slots 11 in spaced relation to each other, and, as a group, located so that the unpierced space 12 at the bottom of the card is narrower than the unpierced space 13 at the top of the card, this arrangement favoring convenience of handling the card by the user thereof, and providing appropriate spaces for printing. Such a card is inserted into a suitable machine, in which it is longitudinally-bowed, as shown in Figure 6, whereby the transverse slots 11 are thrown up into position for the convenient, edgewise insertion into them of the safety-pins 14, as shown in Figure 7, in which the body-wires 15 and the point-wires 16 of the pins are shown as located upon the opposite sides of the central portion of the bowed card. A pin-retaining member, preferably in the form of a locking-strip 17, substantially corresponding to the length of the mounting-card and somewhat narrower than the length of the slots 11, is then inserted between the rear face of the mounting-card and the point-wires of all of the pins, as shown in Figure 8. When the strip has been threaded through all of the pins, the pressure upon the edges of the mounting-card is released and the same allowed to resume its normal flat position, as shown in Figures 2 and 3, whereby the locking-strip is gripped, as it were, between the rear face of the card and the point-wires of all of the pins. The card is now ready for the market, and presents much the same appearance as a card of safety-pins produced in the ordinary manner and as now supplied to the trade.

The consumer may remove the pins from the card individually or collectively, as desired, without mutilating or tearing the card or opening the pins, it being only necessary to grasp the locking-strip by one of its ends and pull it in either direction, so that its opposite end will clear one or more pins, as may be desired.

This removal of the pins will be facilitated by slightly bowing the mounting-card by squeezing it in the palm of the hand prior to the pulling of the locking-strip, but this is optional. Similarly, one or more of the pins may be remounted upon the mounting-card, if desired. It is to be particularly noted that in charging the card, it is unnecessary to open and close the pins, as has heretofore been necessary, nor is it necessary to open the pins for their removal from the card, the mutilation of which is thus avoided, as well as the time required for that somewhat delicate operation. My improved card and method is particularly applicable to the carding of safety-pins in the smaller sizes, which are very difficult to open and close when applied to a card. While my invention is particularly adapted to the carding of safety-pins, it is apparent that it is applicable to the carding of other small articles of manufacture which it is desired to supply to the trade in the same manner and which are adapted in their character to have a locking-strip inserted through their openings.

I have secured the best results by slotting the card, as shown and described, but do not limit myself to piercing the card in any particular manner, it being only necessary that the card shall be pierced so as to be adapted to be charged with a plurality of pins in spaced relation and to permit a locking-strip to be passed through all of the pins, or other articles, and be held thereby against one face of the card.

I claim:

1. As a new article of manufacture, a card of safety-pins, comprising a mounting-card, a plurality of safety-pins applied in spaced relation thereto, and a locking-strip inserted through all of the pins and held in place against one face of the card.

2. As a new article of manufacture, a card of safety-pins, comprising a mounting-card, a plurality of safety-pins applied in spaced relation thereto and projecting on opposite faces thereof, and a gang locking-strip inserted through all of the pins and bearing against one face of the card.

3. As a new article of manufacture, a card of safety-pins, comprising a mounting-card, a plurality of safety-pins applied in spaced relationship thereto, and a gang locking-strip inserted through all of the pins and substantially corresponding in width to those portions of the pins through which it is inserted and comes in contact.

4. As a new article of manufacture, a card of safety-pins, comprising a transversely-slotted card, in which the slots are in spaced relationship, a plurality of pins inserted into the said slots so as to project from the front to the back of the card, and a gang locking-strip inserted through all of the pins from the back of the card upon which the said strip bears.

5. As a new article of manufacture, a card of safety-pins, comprising a mounting-card, a plurality of safety-pins applied in spaced relationship thereto, and a gang locking-strip inserted through all of the pins and longitudinally movable for releasing them singly and collectively.

6. A method of carding safety-pins, consisting in piercing a mounting-card for the reception of a plurality of pins in spaced arrangement, then bending the card longitudinally, then inserting a plurality of pins into the respective piercings of the card, then inserting a gang locking-strip through all of the pins, and then allowing the card to recover its normal shape, whereby the strip is held by the pins against one face of the card.

7. A method of carding safety-pins, consisting in forming a series of transverse slots in a mounting-card, then inserting safety-pins into the respective slots of the card, and then inserting a locking-strip through all of the pins, whereby it is held against one face of the card.

8. A method of carding safety-pins, consisting in slotting a mounting-card, then bending it longitudinally, then inserting safety-pins into its respective slots, then inserting a locking-strip through all of the pins as they appear upon the rear face of the card, and then permitting the card to recover its normal shape, whereby the strip is held in place by the pins.

9. A method of carding safety-pins consisting in piercing a mounting-card, then inserting safety-pins into the piercings of the card, and then inserting a pin-retaining member through all of the pins, whereby they are held in the piercings of the card.

In testimony whereof, I have signed this specification in the presence of two subscribing witnesses.

HENRY M. GLEASON.

Witnesses:
WILLIAM H. DOYLE,
BENJAMIN I. SPOCK.